United States Patent
Heath, Sr.

(10) Patent No.: US 8,696,009 B1
(45) Date of Patent: Apr. 15, 2014

(54) EXTENDABLE MOTORCYCLE RUNNING BOARD ASSEMBLY

(71) Applicant: Randy A. Heath, Sr., Austintown, OH (US)

(72) Inventor: Randy A. Heath, Sr., Austintown, OH (US)

( * ) Notice: Subject to any disclaimer, the term of this patent is extended or adjusted under 35 U.S.C. 154(b) by 0 days.

(21) Appl. No.: 13/852,124

(22) Filed: Mar. 28, 2013

(51) Int. Cl.
*B62J 25/00* (2006.01)

(52) U.S. Cl.
CPC ..................... *B62J 25/00* (2013.01)
USPC ......................... 280/291; D12/114

(58) Field of Classification Search
USPC .............................. 280/291; D12/114; 74/564
IPC ..................... B62J 25/00; B62H 1/00
See application file for complete search history.

(56) References Cited

U.S. PATENT DOCUMENTS

| | | | |
|---|---|---|---|
| 5,090,715 A | 2/1992 | Nakajima et al. | |
| 5,720,359 A | 2/1998 | Attenello | |
| 5,826,900 A | 10/1998 | Steele | |
| 6,719,316 B1 | 4/2004 | Anthony | |
| 6,893,038 B2 * | 5/2005 | Egan | 280/291 |
| 7,431,118 B1 * | 10/2008 | Hogg | 180/219 |
| 7,497,291 B1 * | 3/2009 | McKim | 180/90.6 |
| 7,997,604 B2 * | 8/2011 | Griep et al. | 280/291 |
| D653,174 S | 1/2012 | Parvey | |
| D662,862 S | 7/2012 | Schutz | |
| 8,469,382 B1 * | 6/2013 | Grgurich | 280/291 |

* cited by examiner

*Primary Examiner* — Tony Winner

(57) ABSTRACT

An extendable motorcycle running board assembly expands the supporting surface available to a motorcycle rider to enhance comfort for the rider. The assembly includes a plate having a first end, a second end, and a perimeter edge extending around the plate. A connection aperture extends through the plate. The connection aperture is configured for receiving a running board mounting peg therethrough wherein the plate is pivotally coupled to a motorcycle beneath a running board of the motorcycle. A tab is coupled to and extends from the perimeter edge of the plate and upwardly relative to the plate. Thus, the tab abuts the running board of the motorcycle when the plate is pivoted into a fully extended position relative to the running board of the motorcycle.

9 Claims, 3 Drawing Sheets

EXTENDABLE MOTORCYCLE RUNNING BOARD ASSEMBLY

FIELD OF THE DISCLOSURE

The disclosure relates to running board devices and more particularly pertains to a new running board device for expanding the supporting surface available to a motorcycle rider to enhance comfort for the rider.

SUMMARY OF THE DISCLOSURE

An embodiment of the disclosure meets the needs presented above by generally comprising a plate having a first end, a second end, and a perimeter edge extending around the plate. A connection aperture extends through the plate. The connection aperture is configured for receiving a running board mounting peg therethrough wherein the plate is pivotally coupled to a motorcycle beneath a running board of the motorcycle. A tab is coupled to and extends from the perimeter edge of the plate and upwardly relative to the plate. Thus, the tab abuts the running board of the motorcycle when the plate is pivoted into a fully extended position relative to the running board of the motorcycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
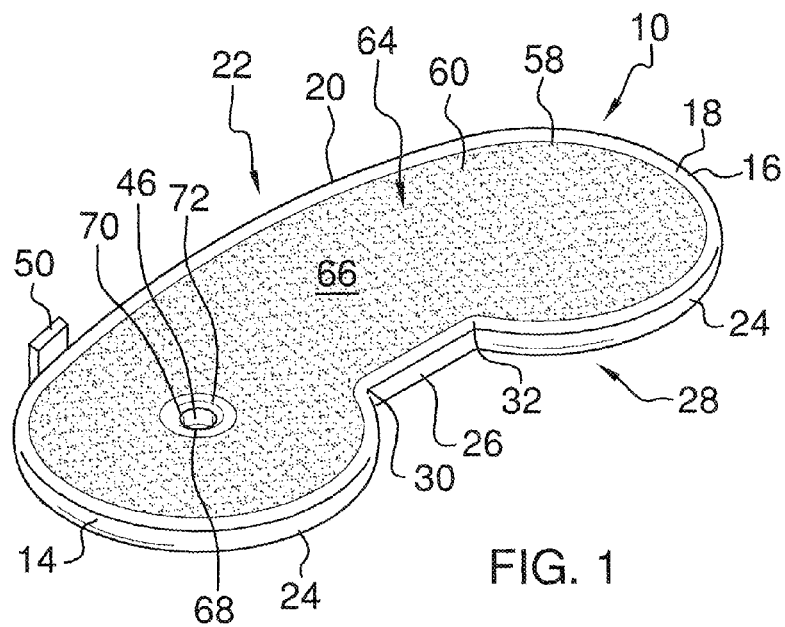
FIG. 1 is a top back side perspective view of an extendable motorcycle running board assembly according to an embodiment of the disclosure.
Figure 2:
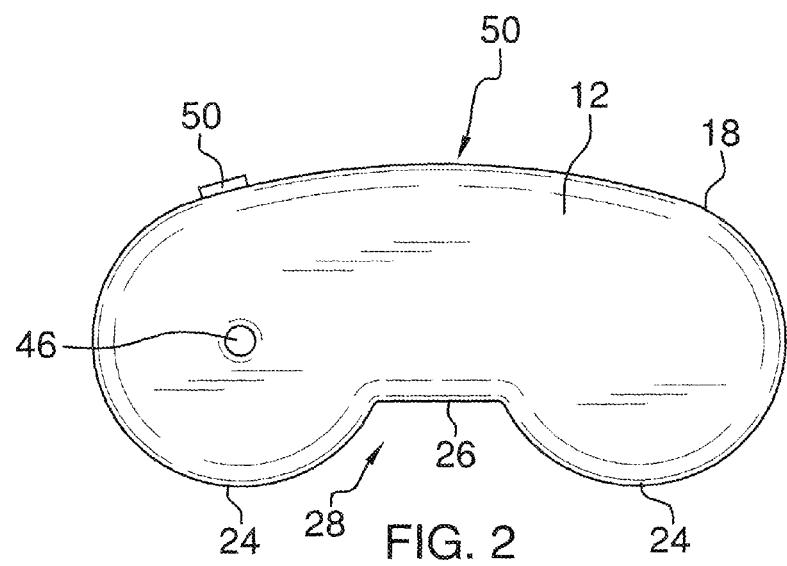
FIG. 2 is a bottom view of an embodiment of the disclosure.
Figure 3:
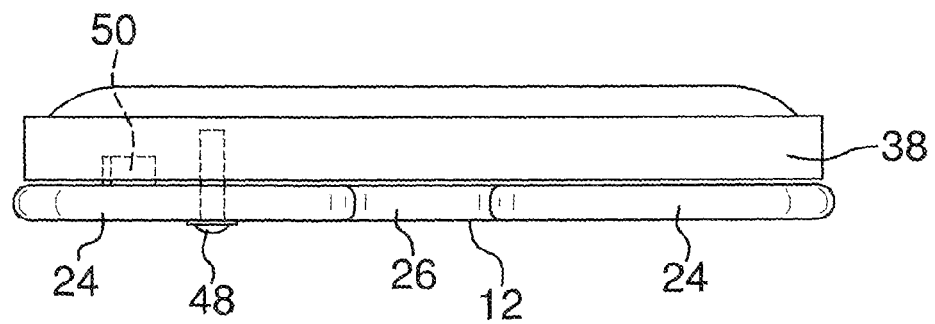
FIG. 3 is a side view of an embodiment of the disclosure.
Figure 4:
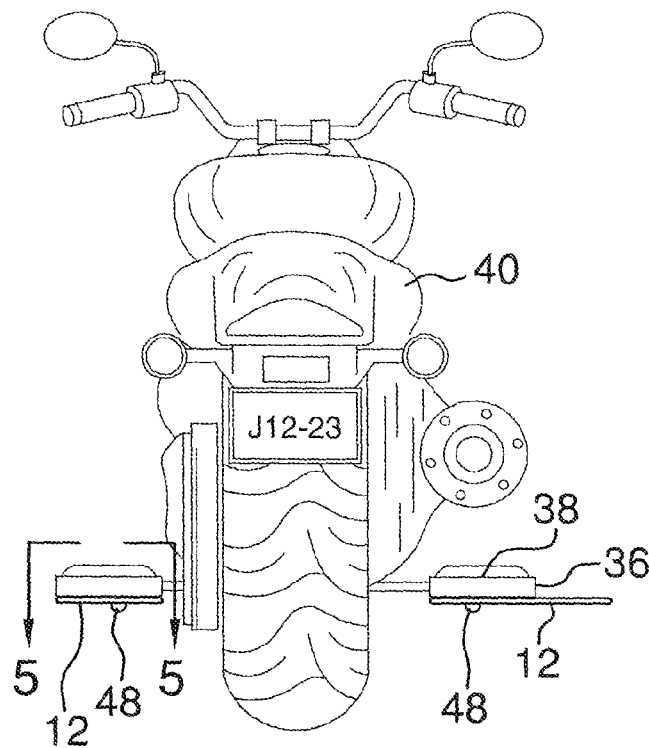
FIG. 4 is a back view of an embodiment of the disclosure coupled to a motorcycle.

With reference now to the drawings, and in particular to FIGS. 1 through 6 thereof, a new running board device embodying the principles and concepts of an embodiment of the disclosure and generally designated by the reference numeral 10 will be described.

Figures 5, 6:
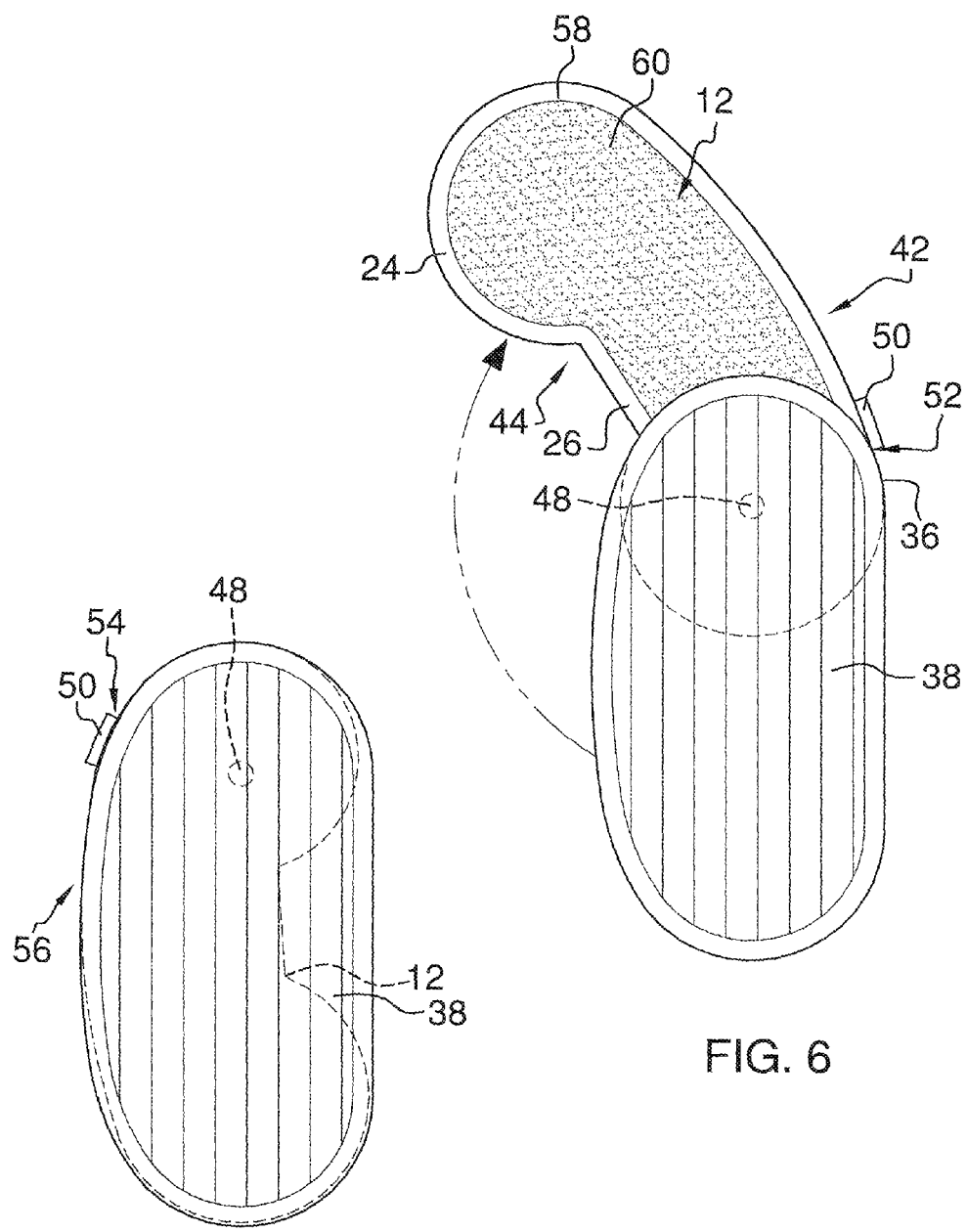
FIG. 5 is a top view of an embodiment of the disclosure in a retracted position.
FIG. 6 is a top view of an embodiment of the disclosure in an extended position.

As best illustrated in FIGS. 1 through 6, the extendable motorcycle running board assembly 10 generally comprises a plate 12 having a first end 14, a second end 16, and a perimeter edge 18 extending around the plate 12. The first end 14 of the plate 12 is arcuate. The second end 16 of the plate 12 is also arcuate and may be symmetrical to the first end 14. The perimeter edge 18 of the plate 12 has a continuous elongated arc 20 defining a first side 22 of the plate 12 extending between the first end 14 of the plate 12 and the second end 16 of the plate 12. The perimeter edge 18 of the plate 12 also has a pair of spaced arcuate sections 24 and a substantially straight section 26 extending between the arcuate sections 24 defining a second side 28 of the plate 12 extending between the first end 14 of the plate 12 and the second end 16 of the plate 12. Opposite ends of the straight section 26 form corners 30, 32 at a junction with the arcuate sections 24. A first of the corners 30 is positioned in alignment with an outer edge 36 of a running board 38 of a motorcycle 40 when the plate 12 is in a fully extended position 42 as shown in FIG. 6. A second of the corners 32 is positioned in spaced relationship to the outer edge 36 of the running board 38 of the motorcycle 40 when the plate is in the fully extended position 42 providing a notch 44 which may be utilized to facilitate stable support of footwear on the plate 12 by resting an edge of the footwear in the notch 44.

A connection aperture 46 extends through the plate 12. The connection aperture 46 is configured for receiving a running board mounting peg 48 therethrough. A conventional piece of hardware can be engaged to the mounting peg 48 wherein the plate 12 is pivotally coupled to the motorcycle 40 beneath the running board 38 of the motorcycle 40. A tab 50 is coupled to and extends from the perimeter edge 18 of the plate 12. The tab 50 extends upwardly relative to the plate 12 wherein the tab 50 is configured to abut the running board 38 of the motorcycle 40 at a first point 52 when the plate 12 is pivoted into the fully extended position 42 relative to the running board 38 of the motorcycle 40. The tab 50 may be further structured to abut the outer edge 36 of the running board 38 at a second point 54, as shown in FIG. 5, when the plate 12 is in a fully retracted position 56.

A rim 58 is coupled to and extends upwardly from the plate 12 extending around the perimeter edge 18 of the plate 12. An insert 60 is coupled to the plate 12. The insert 60 extends over the plate 12 within a cavity 64 defined by the rim 58. The insert 60 may be constructed of rubber or the like providing a frictional upper surface 66 configured to prevent slipping of footwear on the upper surface 66 of the insert 60. A collar 68 is coupled to the plate 12. The collar 68 extends around an upper peripheral edge 70 of the connection aperture 46. An upper surface 72 of the collar 68 is coplanar with an upper edge 74 of the rim 58 to provide stable planar pivoting of the plate 12 relative to the running board 38 of the motorcycle 40.

In use, symmetrical pairs of plates 12 may be provided. Each plate 12 is coupled to the motorcycle 40 under an associated one of the running boards 38. When desired, each plate 12 is pivoted between the fully retracted position 56 to the fully extended position 42 such that the plate 12 extends from the running board 38. A person on the motorcycle 40 may then rest a foot on the plate 12 allowing for enhanced comfort and support of the foot of the rider in a more fully extended position than is available without the plate 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An extendable motorcycle running board assembly comprising:
   a plate having a first end, a second end, and a perimeter edge extending around said plate;
   a connection aperture extending through said plate, said connection aperture being configured for receiving a running board mounting peg therethrough wherein said plate is pivotally coupled to a motorcycle beneath a running board of the motorcycle; and
   a tab coupled to and extending from said perimeter edge of said plate, said tab extending upwardly relative to said plate wherein said tab is configured to abut the running board of the motorcycle when said plate is pivoted into a fully extended position relative to the running board of the motorcycle.

2. The assembly of claim 1, further comprising a rim coupled to and extending upwardly from said plate, said rim extending around said perimeter edge of said plate.

3. The assembly of claim 2, further comprising an insert coupled to said plate, said insert extending over an upper surface of said plate within a cavity defined by said rim.

4. The assembly of claim 3, further comprising said insert having a frictional upper surface.

5. The assembly of claim 3, further comprising a collar coupled to said plate, said collar extending around an upper peripheral edge of said connection aperture.

6. The assembly of claim 5, further comprising an upper surface of said collar being coplanar with an upper edge of said rim.

7. The assembly of claim 1, further comprising said first and second ends of said plate being arcuate, said perimeter edge of said plate having a continuous elongated arc defining a first side of said plate extending between said first end of said plate and said second end of said plate.

8. The assembly of claim 7, further comprising said perimeter edge of said plate having a pair of arcuate sections and a substantially straight section extending between said arcuate sections defining a second side of said plate extending between said first end of said plate and said second end of said plate.

9. An extendable motorcycle running board assembly comprising:
   a plate having a first end, a second end, and a perimeter edge extending around said plate, said first end of said plate being arcuate, said second end of said plate being arcuate, said perimeter edge of said plate having a continuous elongated arc defining a first side of said plate extending between said first end of said plate and said second end of said plate, said perimeter edge of said plate having a pair of arcuate sections and a substantially straight section extending between said arcuate sections defining a second side of said plate extending between said first end of said plate and said second end of said plate;
   a connection aperture extending through said plate, said connection aperture being configured for receiving a running board mounting peg therethrough wherein said plate is pivotally coupled to a motorcycle beneath a running board of the motorcycle;
   a tab coupled to and extending from said perimeter edge of said plate, said tab extending upwardly relative to said plate wherein said tab is configured to abut the running board of the motorcycle when said plate is pivoted into a fully extended position relative to the running board of the motorcycle;
   a rim coupled to and extending upwardly from said plate, said rim extending around said perimeter edge of said plate;
   an insert coupled to said plate, said insert extending over an upper surface of said plate within a cavity defined by said rim, said insert having a frictional upper surface; and
   a collar coupled to said plate, said collar extending around an upper peripheral edge of said connection aperture, an upper surface of said collar being coplanar with an upper edge of said rim.

\* \* \* \* \*